United States Patent [19]

Abe

[11] Patent Number: 5,228,095
[45] Date of Patent: Jul. 13, 1993

[54] APPARATUS FOR RECOGNIZING PRINTED CHARACTERS

[75] Inventor: Keiko Abe, Kanagawa, Japan

[73] Assignee: Sony Corporation, Tokyo, Japan

[21] Appl. No.: 837,902

[22] Filed: Feb. 20, 1992

[30] Foreign Application Priority Data

Feb. 26, 1991 [JP] Japan .................. 3-031110

[51] Int. Cl.⁵ .............................. G06K 9/00
[52] U.S. Cl. ........................ 382/9; 382/18; 382/48
[58] Field of Search ............ 382/9, 48, 18, 51; 358/450, 452, 462

[56] References Cited

U.S. PATENT DOCUMENTS

| | | | |
|---|---|---|---|
| 4,512,032 | 4/1985 | Namba | 382/9 |
| 4,527,283 | 7/1985 | Ito et al. | 382/9 |
| 4,903,311 | 2/1990 | Nakamura | 382/9 |
| 4,998,285 | 3/1991 | Suzuki et al. | 382/9 |
| 5,144,682 | 9/1992 | Nakamura | 382/9 |

Primary Examiner—Joseph Mancuso
Attorney, Agent, or Firm—William S. Frommer; Alvin Sinderbrand

[57] ABSTRACT

An area to be recognized on a document is divided into subareas in a direction of lines of characters, and the dot patterns of the characters in each of the subareas are projected substantially in the direction of the lines of the characters to extract line blocks. Those of the extracted lines which fall within a predetermined width are selected and those line blocks which overlap each other in the direction of the lines of the characters are interconnected to provide the lines of the characters from which the dot patterns of the characters are to be extracted.

2 Claims, 6 Drawing Sheets

FIG. 3A
FIG. 3B
FIG. 3C
FIG. 3D
FIG. 3E
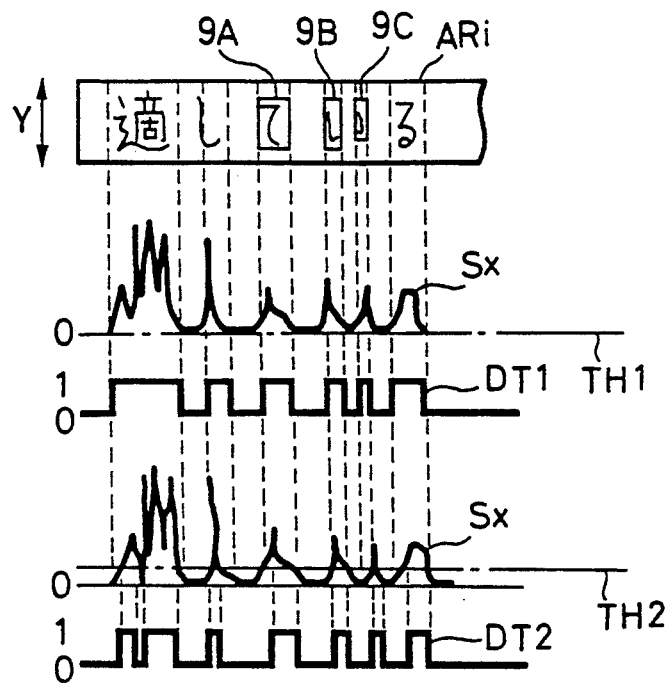
FIG. 4
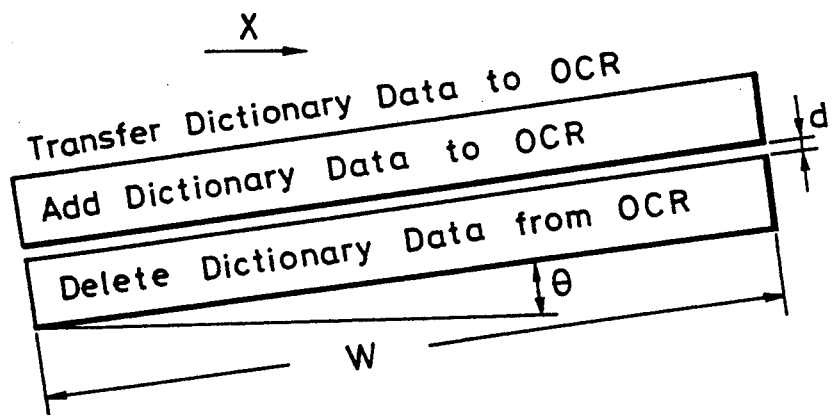

| LB\LB | 13 | 22 | 32 | 42 |
|---|---|---|---|---|
| 13 | 1 | 1 | 0 | 0 |
| 22 | 1 | 1 | 1 | 0 |
| 32 | 0 | 1 | 1 | 1 |
| 42 | 0 | 0 | 1 | 1 |

1 Line { | 1 | 1 | 1 | 1 |

APPARATUS FOR RECOGNIZING PRINTED CHARACTERS

BACKGROUND OF THE INVENTION

1. Field of the Invention

The present invention relates to an apparatus for recognizing printed characters.

2 Description of the Prior Art

To automatize a typographic printing process in which the operator picks up type, it is necessary to employ a character recognition apparatus for recognizing characters on a typed or printed document and converting the recognized characters into character codes.

FIG. 1 of the accompanying drawings shows a conventional character recognition apparatus disclosed in Japanese Laid-Open Patent Publication No. 62-74181. As shown in FIG. 1, the conventional character recognition apparatus has a document reader 1 such as an image scanner which supplies an original character signal S1 that represents optical densities of one page of a document to a character line extractor 2. The optical densities of the document are expressed by dots spaced at a predetermined dot density, and the original character signal S1 is composed of values of "1" each indicating a black dot, for example, and values of "0" each indicating a white dot, for example. The optical density of each of the dots may be expressed by a binary number composed of plural bits.

The character line extractor 2 comprises a first preprocessor 3, a second preprocessor 4, and a third preprocessor 5. The first preprocessor 3 processes the original character signal S1 to remove noise therefrom and also to correct the document as represented by the original character signal S1 out of any rotated condition. The second preprocessor 4 separates a character area AR from other areas that contain photographs, graphic patterns, etc. in the original character signal S1, and extracts only image data contained in the character area AR. The third preprocessor 5 extracts character line signals S4 corresponding respectively to character lines AR1, AR2, . . . contained in the separated character area AR.

The character line signals S4 are extracted as follows: As shown in FIG. 2, the positions of respective dots in the character area AR are expressed according to an X-Y coordinate system having a horizontal X-axis and a vertical Y-axis. The values of "1" or "0" of the respective dots are projected onto the Y axis and added into sums representing Y-axis projected signals Sy. The Y-axis projected signals Sy are converted into respective binary signals using a predetermined threshold value, and the intervals having the value "1" according to the binary signals correspond to the respective character lines AR1, AR2, . . . , respectively.

The character line signals S4 from the character line extractor 2 are then supplied to a character extractor 6. In the character extractor 6, the character line signal S4 of an ith character line ARi (see FIG. 3A), for example, is projected onto the X-axis, with the values of "1" or "0" thereof being added to form a sum which represents an X-axis projected signal Sx, as shown in FIG. 3B. Then, the X-axis projected signal Sx is converted into a roughly extracted signal DT1 (see FIG. 3C) with a threshold value TH1 having a minimum level (i.e., a value of 1) as shown in FIG. 3B, and also converts the X-axis projected signal Sx into a finely extracted signal DT2 (see FIG. 3E) with a threshold value TH2 having a medium level as shown in FIG. 3D. An extracted signal in the Y-axis direction can be generated by generating a Y-axis projected signal Sy in each of the intervals of the roughly extracted signal DT1 that have the value "1".

Finally, the character extractor 6 produces a signal which has a value of "1" within a circumscribed frame 9A (FIG. 3A) of a Japanese hiragana character "て", for example, and which has a value of "1" within circumscribed frames 9B, 9C of the separated elements of a separate Japanese hiragana character "じ", for example. The character extractor 6 produces a succession of such signal values of "1" from the character line signal S4 and outputs the same as a basic rectangular extracted character signal S7.

The finely extracted signal DT2 shown in FIG. 3E is used when the structures of the respective characters are to be analyzed in detail. The separate character "じ" shown in FIG. 3A needs to be integrated in a subsequent character recognition process because the character has two circumscribed frames 9B, 9C of its elements. As shown in FIG. 1, the basic rectangular extracted character signal S7 is supplied from the character extractor 6 to a character recognition unit 7 which reads each of the circumscribed frames of the basic rectangular extracted character signal S7 for character recognition. More specifically, essential features of the dot patterns of respective characters are extracted to classify the dot patterns into groups. Then, pattern matching is effected on the dot patterns within the groups to determine characters most analogous to characters to be recognized, and the characters to be recognized are allotted the character codes of those characters that have been determined as most analogous.

The character codes for one page of the document which are generated by the character recognition unit 7 are stored in a certain memory together with information representing the positions and size of the characters. The recognized characters are displayed in a format corresponding to the document on a display unit 8 so that the operator can determined whether the recognized result is correct or not.

It is difficult for the operator to place documents in the document reader 1 without the documents sometimes being inclined with respect to the document reader 1. Especially when a thick magazine or the like is placed in the document reader 1, the dot patterns produced by the document reader 1 tend to be inclined, and the character lines cannot be extracted accurately. When a document is inclined with respect to the document reader 1, as shown in FIG. 4, the values of dot patterns projected in the X-axis direction are substantially constant, and the character lines cannot be separated from each other.

A critical angle can be defined as an angle $\theta$ at which the character lines are inclined with respect to the X-axis, beyond which the character lines can no longer be extracted. The critical angle $\theta$ is given as follows:

$$W\tan\theta = d \tag{1}$$

where W is the length of character lines on a document, and d is the distance between adjacent character lines. This equation (1) indicates that if the distance d is small or the length W is large due to some additional reference characters or marks, then the character lines cannot be extracted even when they are slightly inclined.

In this connection, the first preprocessor 3 shown in FIG. 1 corrects the document out of any rotated condition through calculations effected on an angle, detected by a sensor, through which the document is inclined. The correcting process is however time-consuming, and employs a complex correcting mechanism. The article Document Typing System (2) written by Mariko Takenouchi et al. from collected preprints of 1986 General National Convention of Electronic Communication Society, pages 6–153 (1986), discloses a character extracting algorithm for dividing a document recognition area into subareas and extracting character lines in each of the subareas. However, the article fails to show an efficient method of integrating the extracted character lines in the subareas.

OBJECTS AND SUMMARY OF THE INVENTION

In view of the aforesaid problems of the conventional character recognition apparatus, it is an object of the present invention to provide an apparatus for recognizing printed characters which is capable of accurately extracting character lines on a document even when they are somewhat inclined, and also of efficiently integrating the extracted character lines so that characters can be properly extracted therefrom.

According to the present invention, there is provided an apparatus for recognizing printed characters, comprising document reading means for converting printed characters on a document into dot patterns with a predetermined resolution, character line extracting means for projecting the dot patterns in a direction of lines of the characters to extract the lines of the characters, character extracting means for extracting the dot patterns of the characters from the extracted lines of the characters, and character recognizing means for recognizing character codes of the printed characters from the dot patterns of the individual characters, the character line extracting means comprising means for dividing the dot patterns into subareas in said direction, projecting the dot patterns in each of the subareas substantially in said direction to extract line blocks, and interconnecting those of the extracted line blocks which overlap each other in said direction to provide the lines of the characters from which the dot patterns of the characters are to be extracted by the character extracting means.

The number of subareas into which the dot patterns are to be divided is adjustable depending on the size of the document.

Even if the document is inclined, the area to be recognized of the document is divided into subareas substantially in the direction of the lines of the characters depending on the degree of inclination of the document. The critical angle which is expressed by the equation (1) is substantially increased for effectively separating the lines of the characters in each of the subareas. Those of the line blocks extracted in the subareas which fall within a predetermined width are extracted to extract character line candidates. Then, those line blocks of the character line candidates which overlap each other in the direction of the lines of the characters are interconnected to extract the lines of the characters easily and accurately.

The above and other objects, features, and advantages of the present invention will become apparent from the following description of an illustrative embodiment thereof to be read in conjunction with the accompanying drawings, in which like reference numerals represent the same or similar objects.

BRIEF DESCRIPTION OF THE DRAWINGS

FIGS. 3A through 3E are diagrams illustrating a conventional process of extracting basic rectangular extracted character signals from a character line;

FIG. 4 is a diagram showing inclined character lines to be recognized by the conventional character recognition apparatus;

DETAILED DESCRIPTION OF THE PREFERRED EMBODIMENT

Figure 1:
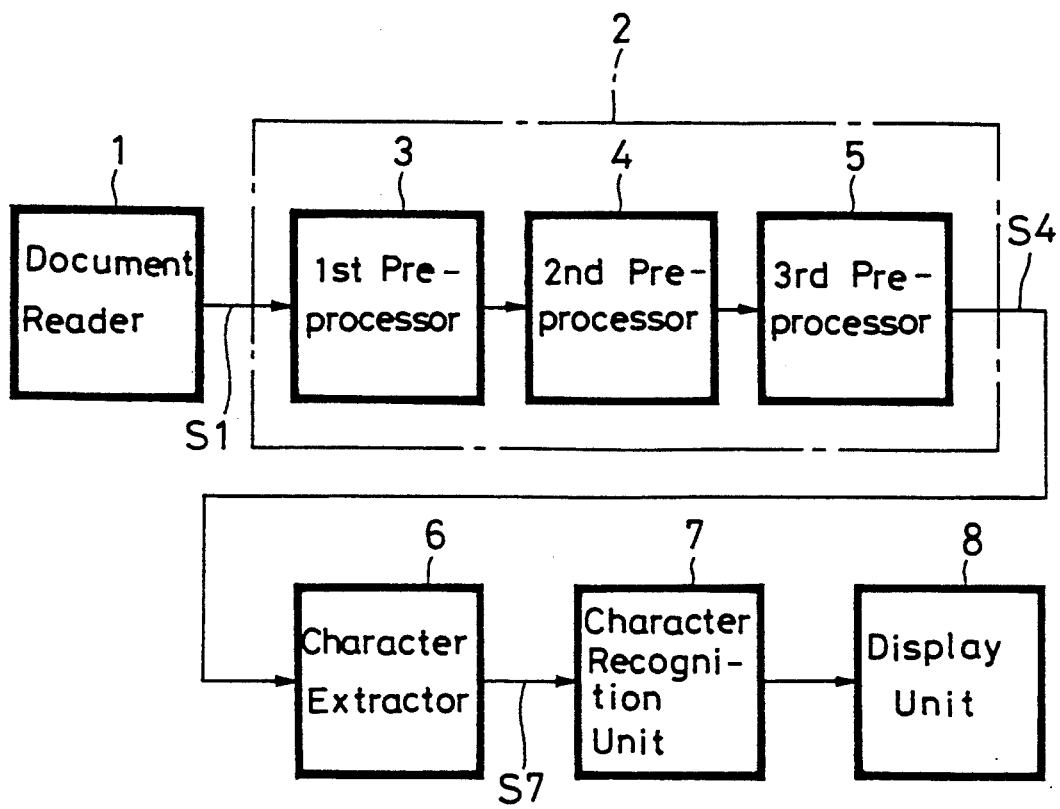
FIG. 1 is a block diagram of a conventional character recognition apparatus.
Figure 2:
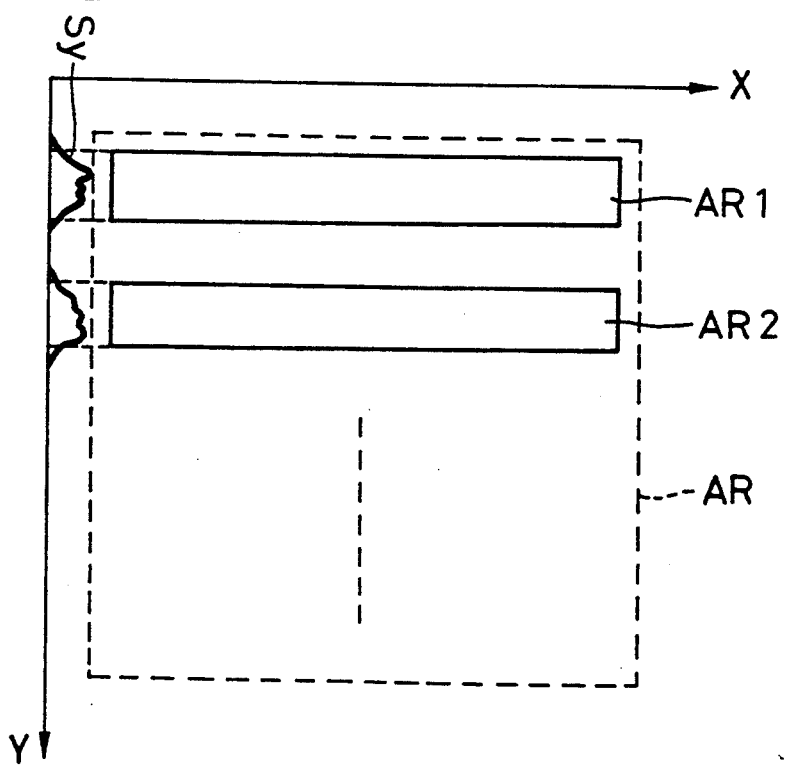
FIG. 2 is a diagram illustrating a conventional process of extracting character lines from a character area on a document.

An apparatus for recognizing printed characters according to the present invention is basically composed of a document reader 1, a character line extractor 2 including first through third preprocessors 3, 4, 5, a character extractor 6, a character recognition unit 7, and a display unit 8, as with the conventional character recognition apparatus shown in FIG. 1. However, the character line extractor 2 operates in a manner different from that of the conventional character recognition apparatus, as described below.

Figure 8:
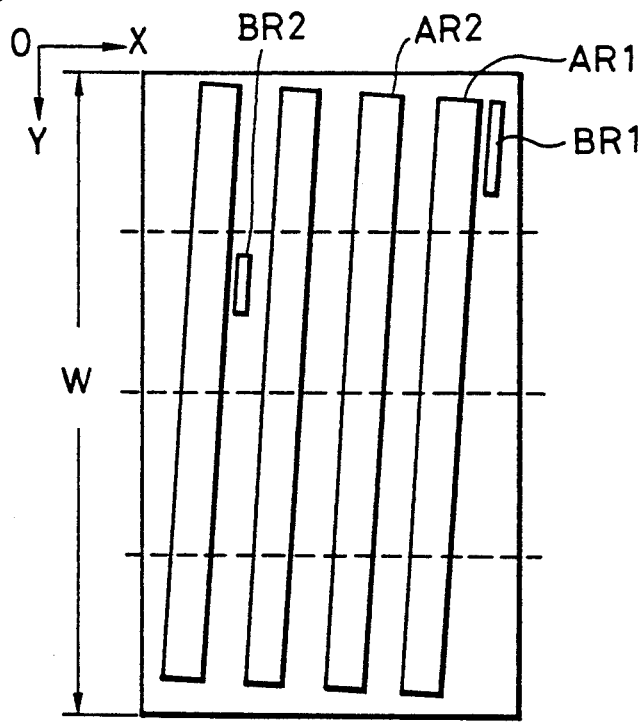
FIG. 8 is a view showing, by way of example, original character lines on a document that are to be recognized.

FIG. 8 shows, by way of example, a document with vertical character lines printed thereon. It is assumed that the document is placed in an X-Y coordinate system having a horizontal X-axis and a vertical Y-axis. An area of the document which is to be recognized has a length W in the Y-axis direction and a certain width in the X-axis direction. The character lines (circumscribed frames thereof) on the document are indicated by AR1, AR2, . . . These original character lines AR1, AR2, . . . are inclined at an angle smaller than four times the critical angle that is expressed according to the equation (1). The document also contains reference character lines BR1, BR2.

Figure 9:
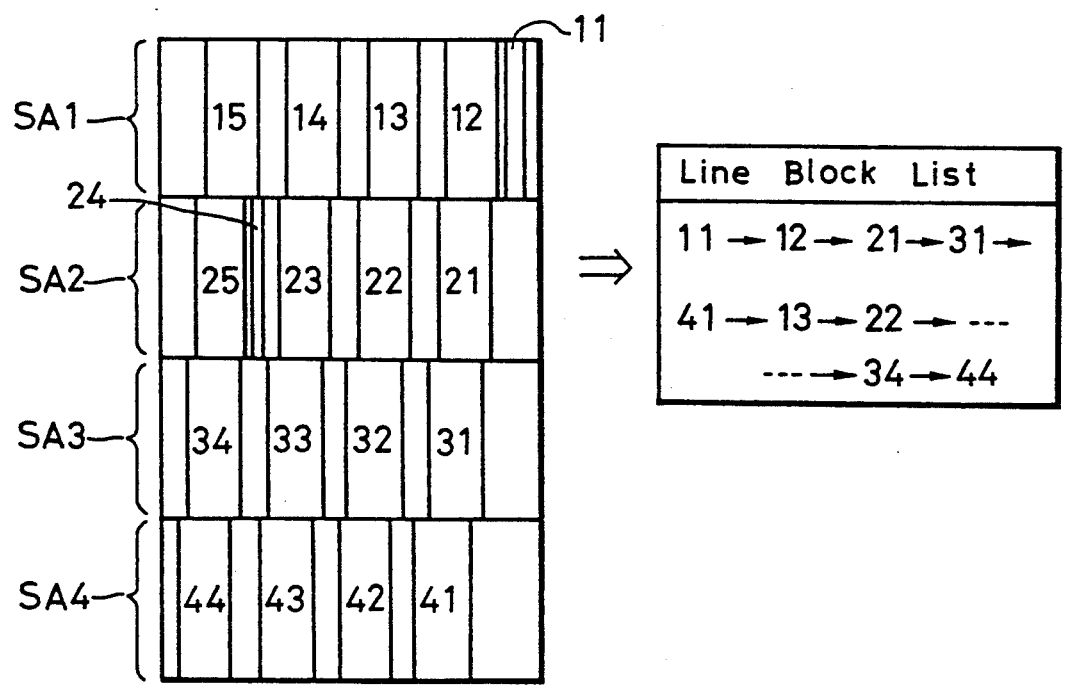
FIG. 9 is a diagram illustrative of line blocks which are extracted after an area to be recognized on the document shown in FIG. 8 is divided into subareas.

The area to be recognized is divided into four subareas SA1, SA2, SA3, SA4 along the Y-axis, i.e., substantially along the character lines, as shown in FIG. 9. The character line extractor is designed to divide the area to be recognized into subareas along the character lines. Therefore, if the character lines on the document extend horizontally along the X-axis, then the area to be recognized is divided into subareas along the X-axis.

Then, the dot patterns of characters in each of the subareas ARi are projected in the direction of the Y-axis to extract character lines. The character lines extracted in each of the subareas SAi are referred to as "line blocks". Specifically, line blocks 11, 12, ..., 15 in the order of smaller X coordinates are produced from the subarea SA1, line blocks 21, ..., 25 from the subarea SA2, line blocks 31, ..., 34 from the subarea SA3, and line blocks 41, ..., 44 from the subarea SA4.

To process the line blocks, a line block list is prepared as shown in FIG. 9. The line block list contains the line blocks arranged in the order of progressively smaller X coordinates from the lefthand end of the list. If the character lines on the document extend horizontally, then the produced line blocks are arranged in the order of progressively larger Y coordinates. In this manner, the line blocks extracted from each of the subareas are arranged in an array. Thereafter, those of the line blocks which belong to the same original character lines shown in FIG. 8 are coupled together to restore the character lines. The line blocks are coupled together in the manner described below.

Figures 5A, 5B, 5C, 5D:
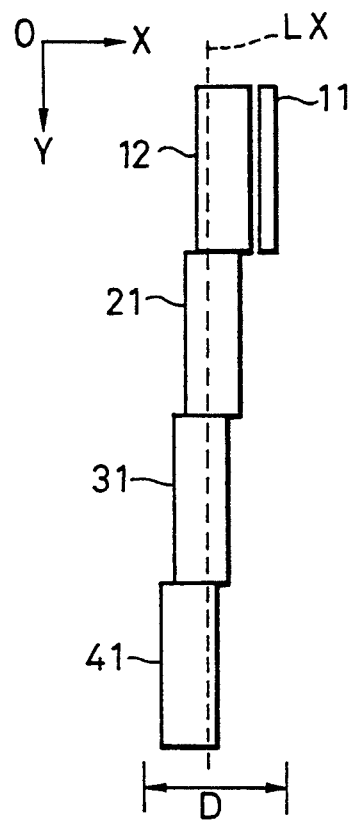
FIGS. 5A through 5D are diagrams showing a process of restoring character lines in a printed character recognition apparatus according to the present invention.

First, a width D of a character line is determined as shown in FIG. 5A. The width D is empirically determined according to statistical data on the widths of character lines. Then, starting from the first line block in the line block list shown in FIG. 9, those line blocks which are present in the width D in the X-axis direction are registered in a line list. In FIG. 5A, the line blocks 11, 12, 21, 31, 41 belong to the same line list. When the line blocks shown FIG. 9 are registered, four line lists are produced as shown in FIG. 5B.

Then, the line blocks belonging to the first line list are arranged in the order of successively larger Y coordinates of their subareas, thereby reproducing the array shown in FIG. 5A. The numbers of the line blocks shown in FIG. 5A are successively noted by vertical columns and a horizontal rows forming a 5×5 matrix which is referred to as a connection matrix, as shown in FIG. 5C. The connection matrix has elements of the value "1" where the line blocks in the vertical column and the horizontal row overlap each other in the Y-axis direction, and elements of the value where they do not overlap each other. In FIG. 5A, the line blocks 12, 21, 31, 41 overlap each other or lie on a common line LX in the Y-axis direction, and the line block 11 is isolated from those line blocks. Therefore, as shown in FIG. 5C, all the elements of a smaller 4×4 matrix located in a lower righthand portion of the 5×5 matrix have the value "1", with all other elements having the value "0" except for the uppermost and leftmost element, which has the value "1".

If two adjacent rows of the connection matrix contain any overlapping or aligned elements of "1" in the Y-axis direction, then these adjacent rows are combined into a single row. If two adjacent rows of the connection matrix do not have any overlapping or aligned elements of "1" in the Y-axis direction, then these adjacent rows remain separate from each other. When two adjacent rows are combined into a single row, overlapping elements of "1" of the adjacent rows will be combined into an element of "1", and aligned elements, one of which is of "1", of the adjacent rows will be combined into an element of "1". This combining process is referred to as compression. Therefore, the connection matrix shown in FIG. 5C is compressed into a two-row matrix as shown in FIG. 5D. The line block 11 shown in FIG. 5A represents a reference character line that is separate from the other line blocks. The data of the dot patterns of the reference character line indicated by the line block 11 and the data of the dot patterns of the character lines indicated by the line blocks 12, 21, 31, 41 are then supplied to the character extractor 6 shown in FIG. 1.

Figures 6A, 6B, 6C:
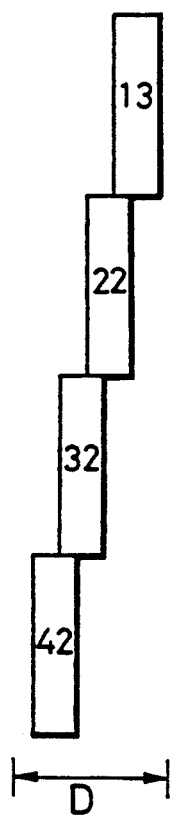
FIGS. 6A through 6C are diagrams showing another process of restoring a character line in the printed character recognition apparatus according to the present invention.

It is assumed that the line blocks 13, 22, 32, 42 are arranged as shown in FIG. 6A with only two adjacent line blocks overlapping each other in the Y-axis direction. As shown in FIG. 6B, any adjacent two rows of elements of a resultant connection matrix contain overlapping or aligned elements of "1" in the Y-axis direction. Therefore, the conenction matrix shown in FIG. 6B is compressed into a single-row matrix with all elements having the value "1", as shown in FIG. 6C. This single-row matrix indicates that the four line blocks shown in FIG. 6A represent a single character line.

Figure 7:
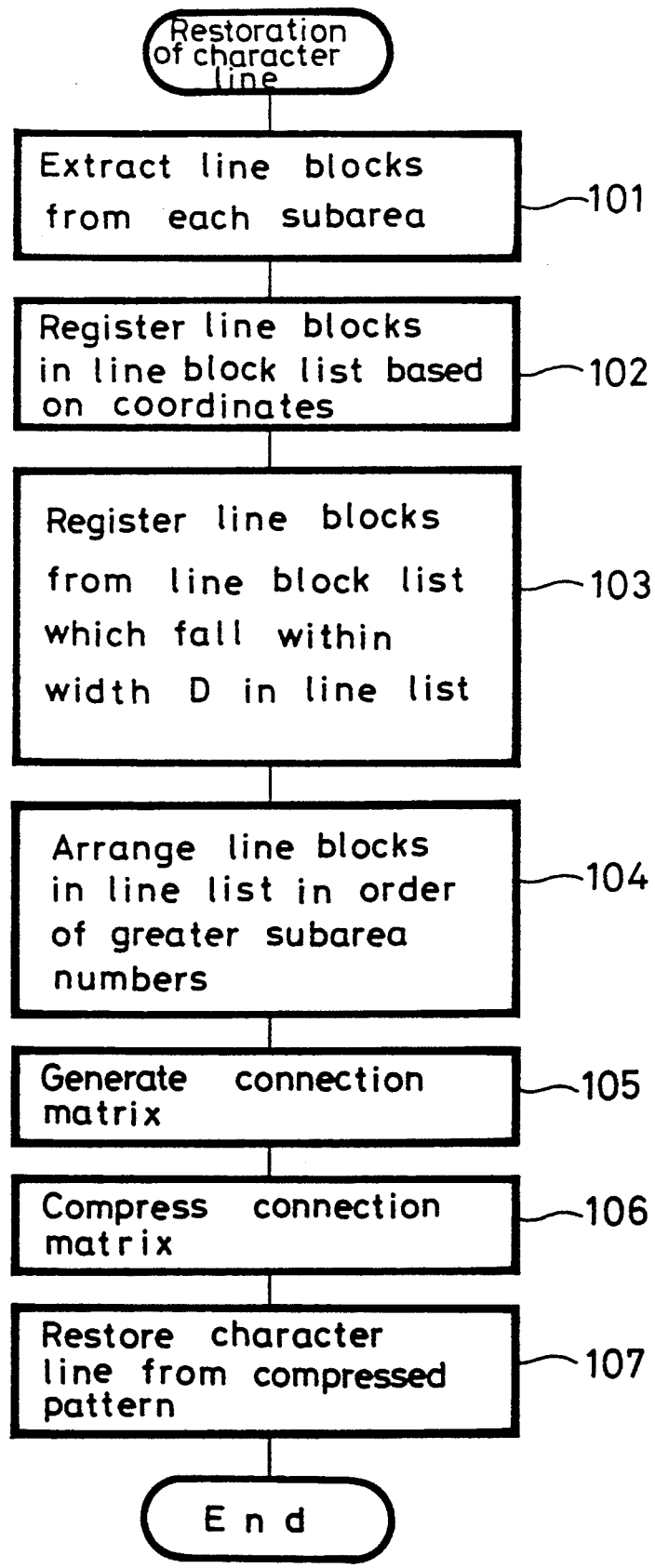
FIG. 7 is a flowchart of the process of restoring a character line or lines as shown in FIGS. 5A through 5D and 6A through 6C.

FIG. 7 shows, by way of a flowchart, the process of restoring a characterline or lines as shown in FIGS. 5A through 5D and 6A through 6C. The illustrated process contains steps 101 through 107.

If the area to be recognized were simply divided into subareas as shown in FIG. 9, a single character, for example, might be broken into adjacent subareas. According to the present invention, however, since adjacent line blocks belonging to one character line are connected to each other, a single character will not remain broken into adjacent subareas, and the characters in the area to be recognized can be recognized with accuracy.

In the illustrated embodiment, the area to be recognized is divided into four subareas in the direction along the character lines. However, the number of subareas into which the area to be recognized is to be divided may vary depending on the width W (FIG. 8) of the character lines. Specifically, if it is assumed that the image scanner as the document reader 1 has a resolution of 400 dpi, the length W of the character lines is expressed in dots, and the number of subareas into which the area to be recognized is to be divided is selected depending on the length W as follows:

| W | Number of subareas |
| --- | --- |
| ~400 | Not divided |
| 400~800 | 2 |
| 800~1000 | 3 |
| 1000~ | 4 |

This method of dividing the area to be recognized into a variable number of subareas means that is the original length W of the character lines is shorter than 400 dots, then the area to be recognized is not divided into a plurality of subareas, and if the original length W of character lines is longer than 1000 dots, then the area to be recognized is divided into four subareas. Since the number of subareas into which the area to be recognized varies depending on the size of the area (i.e., the original length of the character lines), the process of extracting character lines is simpler and quicker than would be the case if the number of subareas simply increased in proportion to the size of the area to be recognized.

With the present invention, character lines on a document can accurately be extracted even if the document is somewhat inclined, and the extracted character lines can be efficiently integrated to allow characters to be extracted properly. The process of extracting character lines is made efficient by adjusting the number of subareas into which the area to be recognized of the document depending on the length of the character lines.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. An apparatus for recognizing characters that are printed on a document in a plurality of substantially parallel character lines, comprising:

means for converting the printed characters into dot patterns with a predetermined resolution;

means for dividing the dot patterns into a plurality of subareas each extending transversely of said plurality of character lines and including respective portions of said plurality of character lines;

means for projecting the dot patterns in each of said subareas in a direction substantially parallel to said character lines so as to extract line blocks;

means for interconnecting those of the extracted line blocks which overlap each other in said direction to form extracted character lines;

means for extracting from the extracted character lines dot patterns corresponding to individual ones of the printed characters; and means for allotting character codes to the printed characters on the basis of said extracted dot patterns corresponding to individual ones of the printed characters.

2. An apparatus according to claim 1, wherein the number of subareas into which the dot patterns are to be divided is adjustable depending on the size of the document.

* * * * *